(12) United States Patent
Miyasaka

(10) Patent No.: US 7,972,010 B2
(45) Date of Patent: Jul. 5, 2011

(54) PROJECTOR FOR PROJECTING AN IMAGE FROM A PLURALITY OF PROJECTORS

(75) Inventor: Akira Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 861 days.

(21) Appl. No.: 11/425,254

(22) Filed: Jun. 20, 2006

(65) Prior Publication Data

US 2006/0285077 A1  Dec. 21, 2006

(30) Foreign Application Priority Data

Jun. 20, 2005  (JP) ................................ 2005-178968

(51) Int. Cl.
*G03B 21/00*  (2006.01)
(52) U.S. Cl. ........................................................ 353/42
(58) Field of Classification Search ................ 353/30, 353/46, 94, 122, 28, 42; 345/127, 157; 348/211.3
See application file for complete search history.

(56) References Cited

U.S. PATENT DOCUMENTS

| | | | | |
|---|---|---|---|---|
| 5,782,548 | A * | 7/1998 | Miyashita | 353/42 |
| 5,988,817 | A * | 11/1999 | Mizushima et al. | 353/94 |
| 6,050,690 | A * | 4/2000 | Shaffer et al. | 353/122 |
| 6,346,933 | B1 * | 2/2002 | Lin | 345/157 |
| 6,715,881 | B2 * | 4/2004 | Fujiwara | 353/21 |
| 6,752,317 | B2 * | 6/2004 | Dymetman et al. | 235/462.45 |
| 6,793,352 | B2 * | 9/2004 | Karasawa et al. | 353/122 |
| 6,814,444 | B2 * | 11/2004 | Miyashita | 353/42 |
| 6,840,625 | B2 * | 1/2005 | Koyama et al. | 353/31 |
| 6,932,481 | B2 * | 8/2005 | Koyama et al. | 353/94 |
| 6,979,087 | B2 * | 12/2005 | Honig et al. | 353/121 |
| 7,059,724 | B2 * | 6/2006 | Miyashita | 353/42 |
| 7,364,304 | B2 * | 4/2008 | Nomizo et al. | 353/30 |
| 7,468,742 | B2 * | 12/2008 | Ahn et al. | 348/207.99 |
| 7,559,656 | B2 * | 7/2009 | Yumiki et al. | 353/42 |
| 2001/0003479 | A1 * | 6/2001 | Fujiwara | 353/122 |
| 2001/0013843 | A1 * | 8/2001 | Fujiwara et al. | 345/1.2 |
| 2002/0122158 | A1 * | 9/2002 | Miyashita et al. | 353/30 |
| 2004/0041786 | A1 * | 3/2004 | Inoue et al. | 345/156 |
| 2005/0071430 | A1 * | 3/2005 | Kobayashi et al. | 709/205 |
| 2005/0197578 | A1 * | 9/2005 | Aratani et al. | 600/443 |
| 2006/0170874 | A1 * | 8/2006 | Yumiki et al. | 353/42 |
| 2006/0174206 | A1 * | 8/2006 | Jung et al. | 715/751 |
| 2007/0005809 | A1 * | 1/2007 | Kobayashi et al. | 709/250 |
| 2008/0106621 | A1 * | 5/2008 | Jung et al. | 348/262 |

FOREIGN PATENT DOCUMENTS

| | | |
|---|---|---|
| CN | 1365459 A | 8/2002 |
| JP | A 6-308879 | 11/1994 |
| JP | A 9-305312 | 11/1997 |
| JP | A 2000-276297 | 10/2000 |
| JP | A 2001-148025 | 5/2001 |
| JP | A 2001-166881 | 6/2001 |
| JP | A 2003-44076 | 2/2003 |
| JP | 2003-098594 | 4/2003 |

(Continued)

*Primary Examiner* — Thanh X Luu
*Assistant Examiner* — Danell L Owens
(74) *Attorney, Agent, or Firm* — Oliff & Berridge, PLC

(57) ABSTRACT

A projector that includes: a projector body including an image optical system for image creation and projection, and an image circuit that operates the image optical system; an auxiliary input unit that forms an auxiliary signal for exercising control over an operating state of the projector body; and a distribution unit that transfers the auxiliary signal formed by the auxiliary input unit to the image circuit and an external display unit.

8 Claims, 11 Drawing Sheets

FOREIGN PATENT DOCUMENTS

| JP | A 2003-216322 | 7/2003 |
| JP | 2004-118807 | 4/2004 |
| JP | A 2004-246721 | 9/2004 |
| JP | A-2005-049666 | 2/2005 |

* cited by examiner

PROJECTOR FOR PROJECTING AN IMAGE FROM A PLURALITY OF PROJECTORS

BACKGROUND

1. Technical Field

The present invention relates to a projector that projects images using a light modulation unit exemplified by a liquid crystal panel, and to a projection system using such a projector.

2. Related Art

In a previous-type projector remote control system, one or more projectors are connected to a control unit over a network. The projector(s) receive image information or others provided by the control unit, and return actually-processed images or others to the control unit. For more details, refer to Patent Document 1 (JP-A-2003-98594). The images or others thus returned to the control unit are displayed so that an operator can check the actual operation of the protector(s).

There is a method of capturing an image of an optical pointer using a camera. The camera is provided for use for capturing a screen image projected by a projector. This camera is used to capture an image of an optical pointer, which is provided for use by an operator to indicate a specific portion of the projected screen at a predetermined wavelength. The position of such an optical pointer is checked, and a mark corresponding to the optical pointer is provided to the projected screen. For more details, refer to Patent Document 2 (JP-A-2004-118807).

The problem with the system of returning projector-processed images or others to a control unit is that the amount of such image-including data is huge, thereby increasing the system cost and causing more difficulty in system maintenance.

The problem with the method of capturing an image of an optical pointer using a camera is that the image processing requires a relatively high speed for a computation process, and the optical pointer detection inevitably goes wrong.

SUMMARY

An advantage of some aspects of the invention is to provide a projector capable of displaying in a simple manner the same pointer image on a plurality of projectors with an inexpensive system of small load for data processing and data transmission/reception, and a projection system equipped with such a projector.

A projector according to an aspect of the invention includes (a) a projector body including an image optical system for image creation and projection, and an image circuit that operates the image optical system, (b) an auxiliary input unit that forms an auxiliary signal for exercising control over the operating state of the projector body; and (c) a distribution unit that transfers the auxiliary signal formed by the auxiliary input unit to the image signal and an external display unit.

In such a projector, a distribution unit transfers an auxiliary signal formed by an auxiliary input unit to both an image circuit and an external display unit so that the auxiliary signal formed by the auxiliary input unit can be shared with the external display unit. That is, the operation harmony can be achieved between the projector and the external display unit, thereby enabling control over a projection system including the projector and the external display unit to make the same display as circumstances demand, for example.

From a specific side perspective or aspect of the invention, in the above projector, the auxiliary input unit is a controller unit for use by a user to set the operation state of the projector body. With this being the case, using a controller unit connected to the projector, the user is allowed to exercise collective control over a projection system including the projector and an external display unit.

In another aspect of the invention, the image circuit includes an image synthesis unit that is capable of overlaying, on an image for projection from the projector body, a predetermined auxiliary image related to the auxiliary signal. Such a unit provision enables overlaying of various auxiliary images related to an image for projection, thereby allowing the display of any same auxiliary images on the projector and the display unit configuring the projection system.

In still another aspect of the invention, the controller unit outputs the auxiliary signal for projecting a pointer image as the predetermined auxiliary image on a screen. This allows the display of any same pointer image on the projector and the display unit configuring the projection system, and the pointer image can be moved synchronously.

In still another aspect of the invention, the controller unit outputs a command that changes the display state of the image for projection from the projector body. This enables collective switching of display mode for images for projection, or collective page change.

In still another aspect of the invention, the distribution unit converts the auxiliary signal output from the auxiliary input unit into a signal conforming to the external display unit. This enables easy sharing of information about data, signals, or others between the projector and the display unit configuring the projection system.

In still another aspect of the invention, when a contention occurs between the projector body and the external display unit in terms of operation, the distribution unit outputs, to the external display unit, a command signal to give a higher priority to the projector body for operation. This enables to control any other external display unit to go through a display operation in response to the operation of the projector body.

A projection system according to an aspect of the invention includes (a) the above-described projector, (b) the external display unit that operates in accordance with the auxiliary signal output from the projector, and (c) a communications unit that establishes an electrical connection between the projector and the external display unit.

In such a projection system, an auxiliary signal derived in a projector is transferred to an external display unit so that an auxiliary signal being a control signal or others can be shared between the projector and the external display unit. That is, the operation harmony can be achieved between the projector and the external display unit, thereby enabling control over the projection system including the projector and the external display unit to make the same display as circumstances demand, for example.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
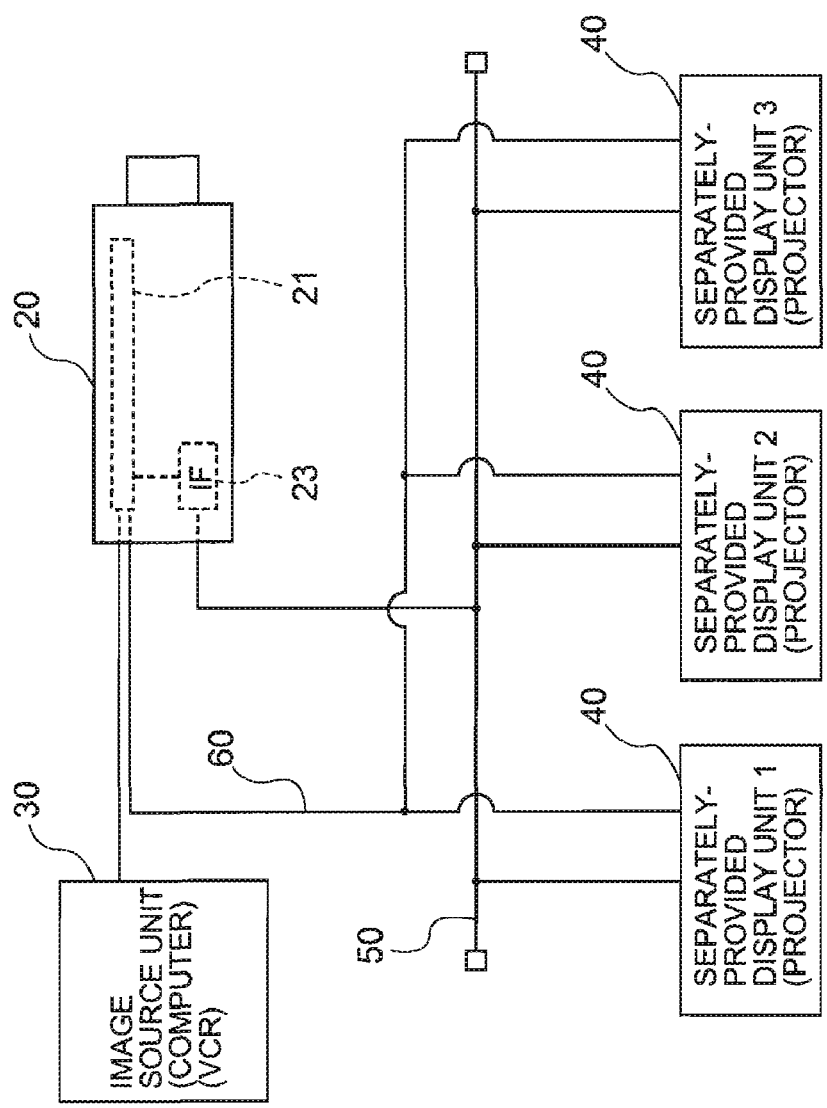
FIG. 1 is a block diagram for illustrating a projection system of a first embodiment.

FIG. 1 is a conceptual block diagram for illustrating the configuration of a protection system in a first embodiment of the invention.

A projection system 10 is configured to include: a projector 20 for image projection; an image source unit 30 that outputs signals to the projector 20; a plurality of separately-provided display units 40 that are also projectors or others operating in synchronous with the projector 20; and a control communications line 50 that establishes a connection between the projector 20 and the separately-provided display units 40 for communications.

The projector 20 serves to create images through reception of external image signals coming from the external image source unit 30, and projects color images or others on a screen, which is not shown. The image source unit 30 is digital equipment, exemplified by a video reproduction device including a DVD (Digital Versatile Disc) player or others, a personal computer, or others. In response to a user's operation, the image source unit 30 generates image signals of predetermined specifications, exemplified by video signals, RGB signals, or others. The separately-provided display unit 40 is premised to be a projector having functions similar to the projector 20, but may be digital equipment with a display, e.g., personal computer. The control communications line 50 is a communications unit for sharing a control-use auxiliary signal between the primary projector 20 and each of the separately-provided display units 40. Such a control communications line 50 is exemplified by a wired or wireless branch circuit for signals, or a bidirectional digital communications network. The control communications line 50 is provided mainly for exchange of computer control commands and their accompanying small amount of data, and is configured to be a small-scale economical communications device with small signal transmission capacity.

A cable 60 is branched from the image source unit 30 to each of the separately-provided display units 40 via the projector 20. The cable 60 is provided for transmission of image signals, e.g., video signals or RGB signals, in one direction with or without branching, and in this case, is a simple transmission line with no amplification or others.

Although the details are left for later description, the projector 20 is equipped therein with a processing circuit 21, which receives external image signals from the image source unit 30 to operate mainly an image optical system (not shown). The processing circuit 21 relays the external image signals to each of the separately-provided display units 40 over the cable 60. The configuration of FIG. 1 is exemplary, and the external image signals coming from the image source unit 30 may be directly sent out to each of the separately-provided display units 40 with no relay by the projector 20. The projector 20 is also equipped therein with an interface unit 23, which is a signal distribution unit belonging to the processing circuit 21. The interface unit 23 distributes a control-use auxiliary signal generated by the projector 20 to each of the separately-provided display units 40 over the control communications line 50. At the time of signal distribution as such, the interface unit 23 converts the control-use auxiliary signal into a signal conforming for sharing with any other equipment.

Figure 2:
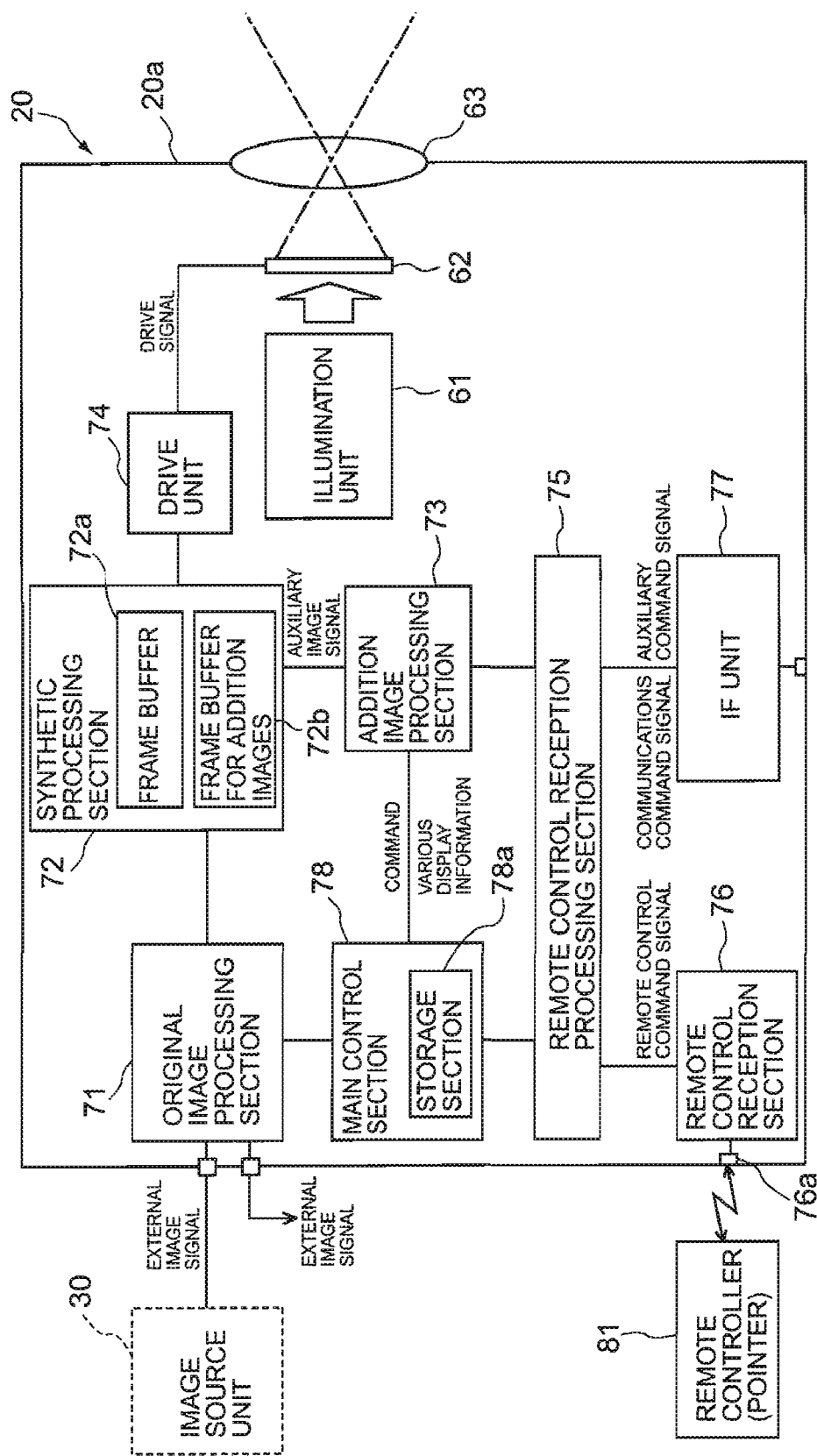
FIG. 2 is a block diagram for illustrating the internal configuration of the projector of FIG. 1.

FIG. 2 is a block diagram for illustrating the internal configuration of the projector 20 of FIG. 1. The projector 20 is configured to include, as an image optical system: an illumination unit 61; a light modulation unit 62; and a projection optical system 63. As a processing circuit, the projector 20 is configured to include: an original image processing section 71; a synthetic processing section 72; an addition image processing section 73; a drive unit 74; a remote control reception processing section 75; a remote control reception section 76; an IF (interface) unit 77; and a main control section 78. The components of the original image processing section 71, the drive unit 74, and others serve as an image circuit that directly operates the image optical system including the light modulation unit 62 and others. The components of the illumination unit 61, the light modulation unit 62, the projection optical system 63, the original image processing section 71, the synthetic processing section 72, the addition image processing section 73, the drive unit 74, or others are the projector body for image display. Such a circuit unit is made of electronic components or others incorporated on a printed substrate, and is housed in an exterior case 20a together with the image optical system.

In the image optical system, although not shown, the illumination unit 61 is provided with a lamp or LED (Light-Emitting Diode), a light uniformizing unit, and a polarization conversion unit. The lamp or LED generates light for supply from the light source sufficiently for formation of object image light. The light uniformizing unit forms illumination light for the light modulation unit 62 by uniformizing the light from the light source in the cross section of a luminous flux. The polarization conversion unit converts the illumination light to a single polarization component.

The light modulation unit 62 is a liquid crystal light valve of a color display type. Although not shown, the light modulation unit 62 is of a configuration that a liquid crystal display panel is sandwiched by a pair of polarizer plates. In such a configuration, the polarizer plate on the light-enter side increases the polarization level of illumination light, and the liquid crystal display panel between the polarizer plates modulates the illumination light on a pixel basis in response to a drive signal so as to adjust the polarization state of the illumination light. From the resulting modulated light derived by the liquid crystal display panel as such, the polarizer plate on the light-exit side selects the polarization component in a specific direction so that object image light is formed. In FIG. 2 examples although a liquid crystal light valve is shown as if solely provided, the liquid crystal light valve may be provided for every color of red, green, and blue. With this being the case, the liquid crystal light valves may be illuminated by illumination lights of each corresponding color, and the modulated light from each of the liquid crystal light valves may be synthesized at a specific spot so that a synthetic color image is formed.

The projection optical system 63 projects an object image as projection light onto a screen (not shown) with any appropriate enlargement ratio. The object image is a moving or static image formed by the light modulation unit 62.

In the processing circuit, the original image processing section 71 is provided with a correction section, which applies correction to an incoming external image signal as required. The correction section subjects an external image signal to various types of image processing, e.g., color correction or distortion correction in response to a command coming from the main control section 78.

The synthetic processing section 72 is a circuit portion needed for activating the function of OSDC (On Screen Display Control). The synthetic processing section 72 serves as a synthesis unit that can generate a signal displaying various types of display information, e.g., text information, a pointer image, or others corresponding to an auxiliary image signal. The signal displays such display information over or as a replacement for a normal image for the external image signal. That is, the synthetic processing section 72 is capable of displaying text information or others over an image on a screen captured from the outside, and of displaying a pointer image also over an image on a screen. More in detail, the synthetic processing section 72 receives a normal image signal from the original image processing section 71 for storage into a frame buffer 72a, and receives an auxiliary image signal from the addition image processing section 73 for storage into another frame buffer 72b specifically for addition images. By synthesizing the signals stored in the frame buffers 72a and 72b, the synthetic processing section 72 applies modulation to the light modulation unit 62 via the drive unit 74. This modulation is equivalent to various types of display information including texts, graphics, or others that has nothing to do with the external image signal. This enables to project the various types of display information on the screen via the projection optical system 63 as an object image formed by the light modulation unit 62.

Then there is no signal input into the frame buffer 72b from the addition image processing section 73, the synthetic processing section 72 outputs the image signal stored in the frame buffer 72a as it is.

The addition image processing section 73 generates an addition image signal, i.e., an auxiliary image signal, for recording into the frame buffer 72b in the synthetic processing section 72. Such signal generation is made based on commands and various display information coming from the main control section 78. The display information here includes text or graphic information about the projector 20, e.g., operation setting, check menu, operation state, or processing result, or a pointer image displayed by user operation and moves freely on the screen, for example.

The drive unit 74 generates a drive signal for use for controlling the state of a liquid crystal display panel equipped to the light modulation unit 62. Such signal generation is made based on an image signal provided by the synthetic processing section 72 after image synthesis. This enables to create, on the liquid crystal display panel, an image of a transmittance distribution corresponding to the image signal or others provided by the synthetic processing section 72.

The remote control reception processing section 75 is a communications control unit operating under the control of the main control section 78. That is, the remote control reception processing section 75 is provided to enable communications between the internally-provided main control section 78 and an externally-provided remote controller 81 or the separately-provided display units 40 of FIG. 1. The remote control reception processing section 75 is wirelessly connected to the remote controller 81 via the remote control reception section 76, and is also connected to the control communications line 50 of FIG. 1 via the IF unit 77. The remote control reception processing section 75 transfers a remote control command signal to the main control section 78 so as to allow a user to control the operation state of the projector 20 as appropriate. The remote control command signal is provided by the user-operated remote controller 81 via the remote control reception section 76. Based on a command coming from the main control section 78, the remote control reception processing section 75 performs signal transfer to the addition image processing section 73. The signal to be transferred here is the remote control command signal if it is considered necessary for processing in the addition image processing section 73. The addition image processing section 73 generates an auxiliary image signal based on such a remote control command signal or the command coming from the main control section 78. Based on the command coming from the main control section 78, the remote control reception processing section 75 forwards, to the IF unit 77, a communications command signal coming from the main control section 78 or an auxiliary command signal. The auxiliary command signal is the remote control command signal that is supposed to be transmitted to the outside.

The remote control reception section 76 is provided with an infrared sensor 76a, and wirelessy receives a remote control command signal from the remote controller 81 so that the signal is converted into a signal of a format suiting to processing in the remote control reception processing section 75. The remote controller 81 is provided with various types of keys, and outputs an infrared signal in response to a user's key operation.

Figure 3:
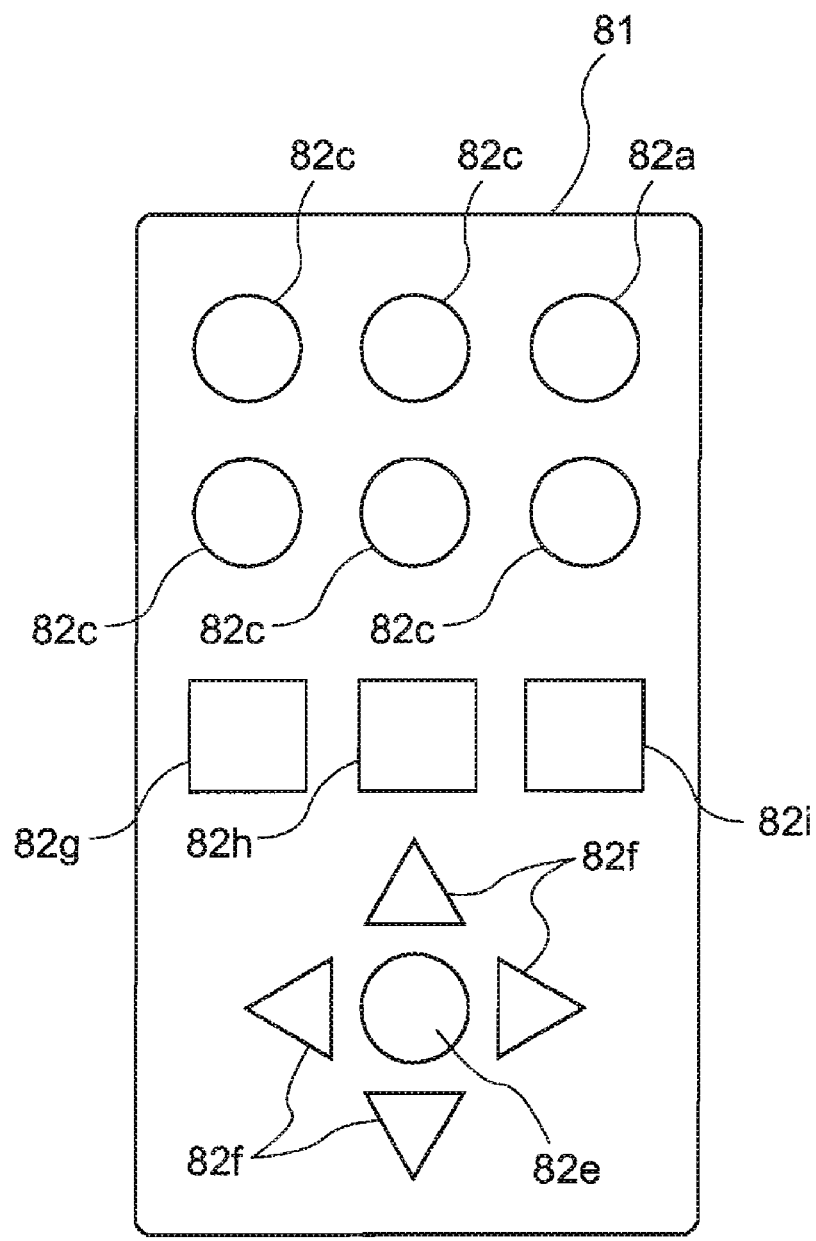
FIG. 3 is a diagram for illustrating the outer appearance of a remote controller.

FIG. 3 is a diagram for illustrating the outer appearance of the remote controller 81 serving as an auxiliary input unit. As is evident from the drawing, the upper surface area of the remote controller 81 is provided with an ON/OFF button 82a being a power button, and various other buttons 82c for input switching, menu display, enter, distortion correction implementation, and others. The lower surface area of the remote controller 81 is provided with a pointer image ON/OFF button 82e, an up-down/right-left movement button 82f, a shape change button 82g, a speed change button 82h, and a color change button 82i. The pointer image ON/OFF button 82e is for transmitting, to the remote control reception section 76, a signal corresponding to a command, whether or not to display a pointer image over an image to be projected on the screen. The up-down/right-left movement button 82f is for transmitting, to the remote control reception section 76, a signal corresponding to a command to move a pointer image on the screen in any desired direction. The shape change button 82g is for transmitting, to the remote control reception section 76, a signal corresponding to a command to sequentially change the shape of a pointer image on a screen. The speed change button 82h is for transmitting, to the remote control reception section 76, a signal corresponding to a command to sequentially change the movement speed of a pointer on a screen. The color change button 82i is for transmitting, to the remote control reception section 76, a signal corresponding to a command to sequentially change the color of a pointer image on a screen.

Referring back to FIG. 2, the IF unit 77 corresponds to the interface unit 23 of FIG. 1, and to the separately-provided display units 40 of FIG. 1, distributes various types of command signals and data derived by the remote control reception section 76. The IF unit 77 enables bi-directional communications with each of the separately-provided display units 40. More in detail, a connection is established by hand shaking under the data communications control with any appropriate communications protocol. The IF unit 77 then forwards any required command and data to the external separately-provided display units 40, or receives any needed data from the external separately-provided display units 40.

The main control section 78 is a control unit being a microcomputer, and operates by following a program that is provided as necessary for exercising control over the components of the original image processing section 71, the synthetic processing section 72, the addition image processing section 73, and others. The main control section 78 is equipped therein with a storage section 78*a*, from which various types of data needed for operation of the components is read whenever necessary. The components here include the original image processing section 71, the synthetic processing section 72, the addition image processing section 73, or others. The main control section 78 also stores any necessary information to the storage section 78*a* whenever required. For example, the main control section 78 receives a remote control command signal from the remote controller 81 via the remote control reception section 76 and the remote control reception processing section 75, and goes through various operations corresponding to the remote control command signal. The operations corresponding to the remote control command signal include power ON/OFF, source switching, and volume control, for example. The operations also include a command for trapezoid correction that is supposed to be applied to an external image signal in the original image processing section 71, for example.

Note here that the remote controller 81 transmitting a remote control command signal to the main control section 78 is used also to input any other user-desired command and setting to the main control section 78. At this time, the components of the synthetic processing section 72, the addition image processing section 73, the drive unit 74, the light modulation unit 62, the projection optical system 63, or others each serve as a GUI input unit of showing information to the user. The information includes operation setting, check menu, operation state, processing result, or others, all of which are controlled by the main control section 78.

Figure 4:
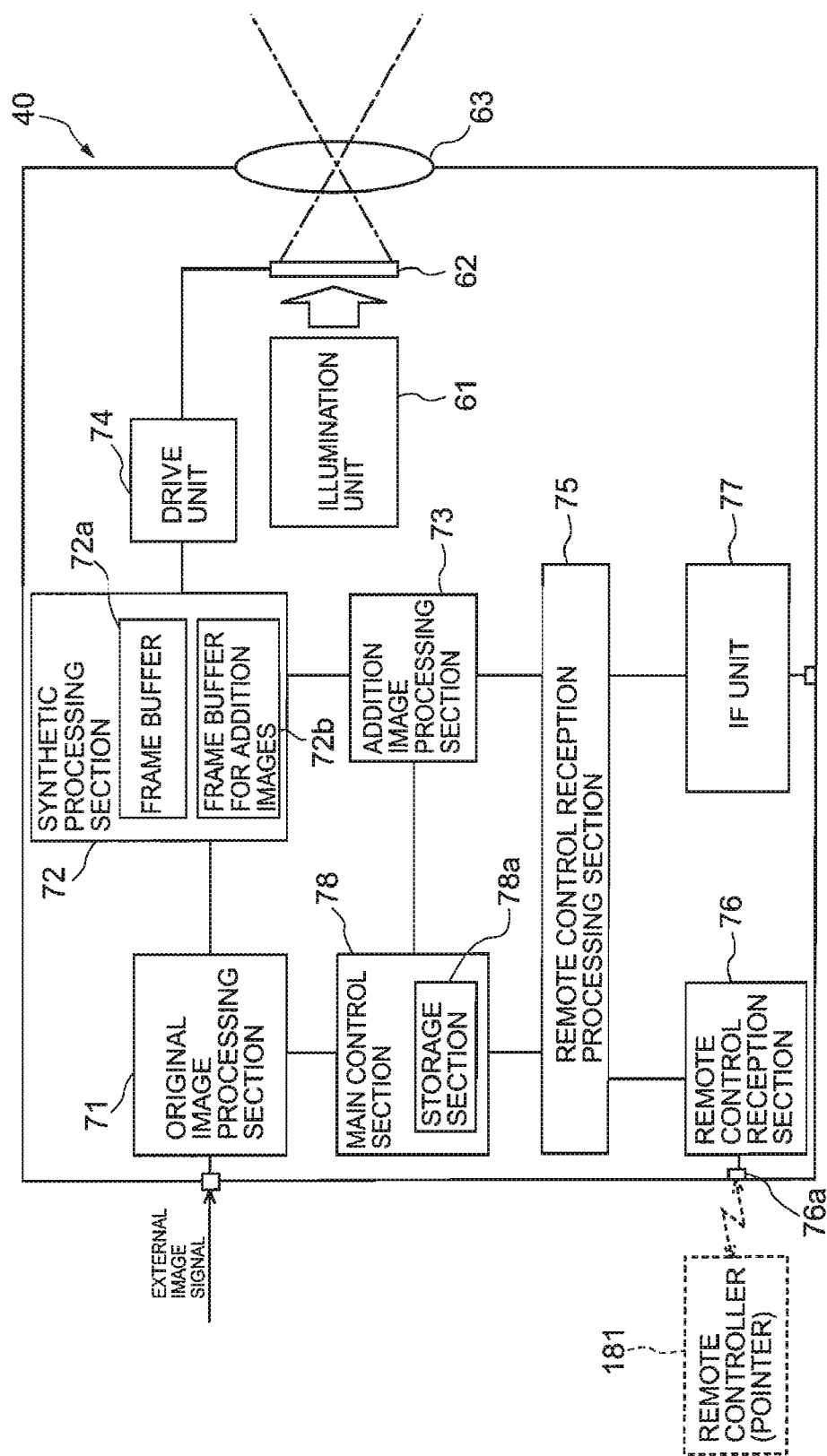
FIG. 4 is a block diagram for illustrating an exemplary the internal configuration of a separately-provided display unit of FIG. 1.

FIG. 4 is a block diagram for illustrating an exemplary internal configuration of the separately-provided display unit 40 of FIG. 1. The separately-provided display unit 40 is configured to include, as an image optical system: the illumination unit 61; the light modulation unit 62; and the projection optical system 63. These unit components 61, 62, and 63 are similar in configuration and function as the unit components 61, 62, and 63 of FIG. 2, and thus are not described in detail again. As a processing circuit, the separately-provided display unit 40 is configured to include: the original image processing section 71; the synthetic processing section 72; the addition image processing section 73; the drive unit 74; the remote control reception processing section 75; the remote control reception section 76; the IF unit 77; and the main control section 78. These unit components 71, 72, 73, 74, 75, 76, 77, and 78 are similar in configuration and function as the unit components 71, 72, 73, 74, 75, 76, 77, and 78 of FIG. 2, and thus are not described in detail again.

With the separately-provided display unit 40 of FIG. 4, although the remote control reception section 76 can receive a remote control command signal from a dedicated remote controller 181, exemplified here is a case of not using such a dedicated remote controller 181, and receiving no remote control command signal. The IF unit 77 is connected to the projector 20 of FIG. 2 over the control communications line 50, and can receive various types of command signals and data acquired by the projector 20 of FIG. 2. That is, commands from the remote controller 81 belonging to the externally-apart projector 20 can be reflected to the operation of the separately-provided display unit 40, and the entire system can be operated as if collectively controlled by a single remote controller 81. Specifically, through operation of the remote controller 81, the operation mode or others can be simultaneously switched for both the projector 20 and the separately-provided display unit 40, or the same pointer image can be displayed thereon.

Described next is the main operation of the projector 20, mainly about the operation of the main control section 78.

Figure 5:
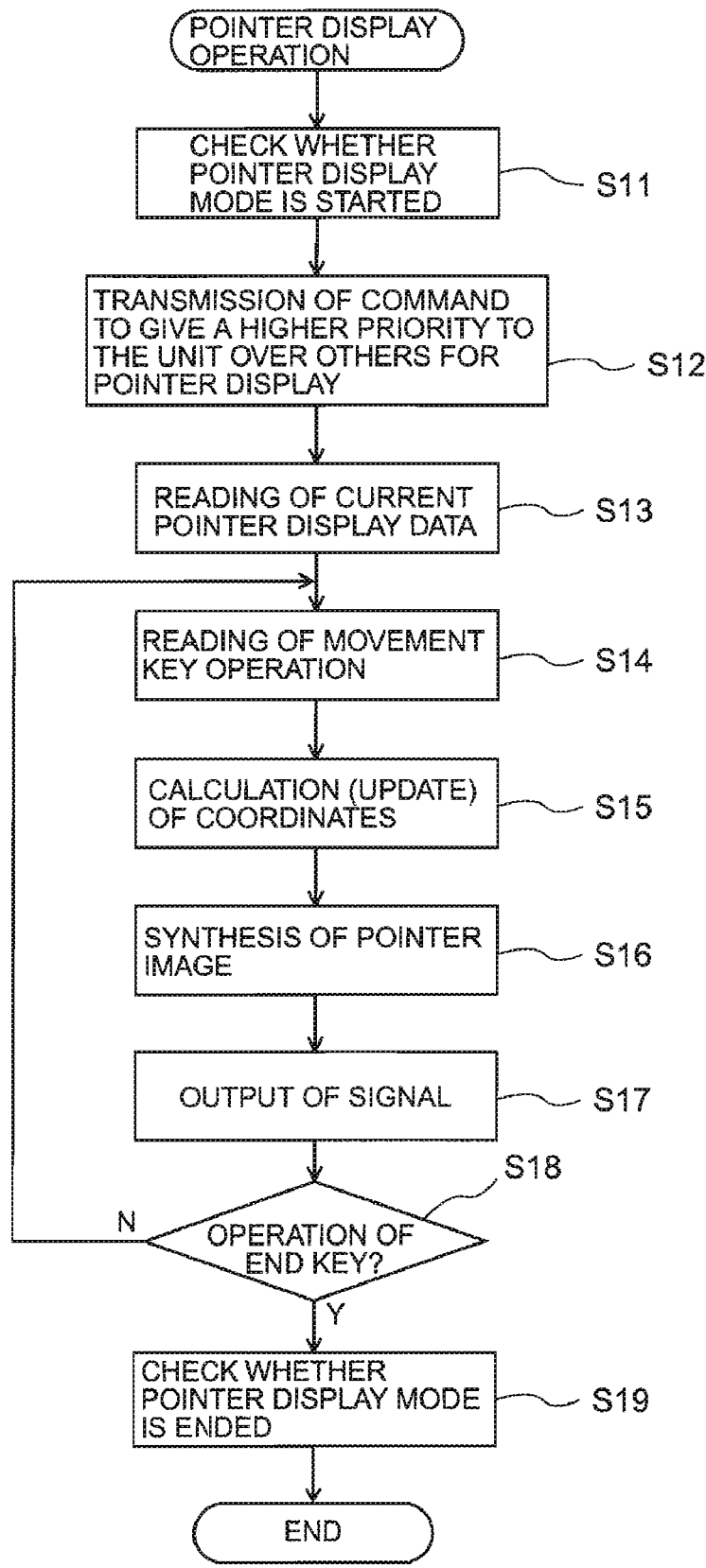
FIG. 5 is a flowchart for illustrating a pointer display operation of a projector.

FIG. 5 is a flowchart for illustrating a pointer display operation of the projector 20. Exemplified here is a case where a user wants to display a pointer image by operating the pointer image ON/OFF button 82*e* of the remote controller 81. In this case, by referring to the storage section 78*a*, the main control section 78 reads image data corresponding to a start check dialog for a pointer display mode. The main control section 78 controls, via the addition image processing section 73, the synthetic processing section 72 to synthesize the image data, and then controls, via the drive unit 74, the light modulation unit 62 to go through any corresponding display operation (step S11). As a result, an image created in the light modulation unit 62 is projected on the screen via the projection optical system 63 for check use of a pointer display start.

The main control section 78 then forwards an auxiliary command signal (in this example, slave command signal) to the external separately-provided display unit 40 via the remote control reception section 76 and the IF unit 77 (step S12). The auxiliary command signal is generated from the remote control command signal, and is forwarded to activate the command from the remote controller 81 of the projector 20 also in other separately-provided display units 40. As a result, for the commands coming from the remote controller 81, the master-slave relationship is established from a control perspective, i.e., the projector 20 being a master, and the separately-provided display unit 40 being a slave. This enables to transfer, to the external separately-provided display unit 40, an auxiliary command signal as a part of the remote control command signal from the remote controller 81, and accordingly the external separately-provided display unit 40 operates in accordance with the auxiliary command signal derived from the remote controller 81.

Figure 6:
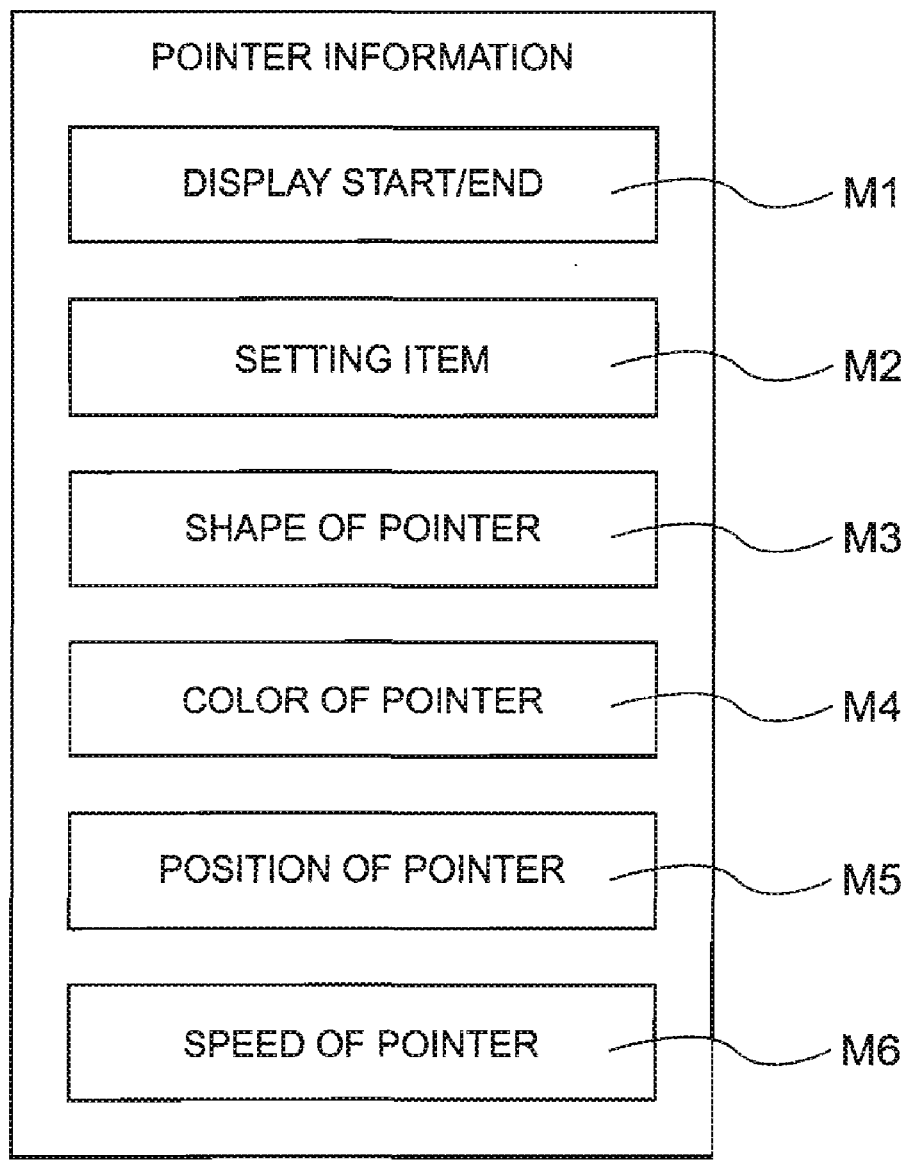
FIG. 6 is a diagram for illustrating pointer display data for storage into a storage section.

The main control section 78 then refers to the storage section 78*a* to read the current pointer display data (step S13). This pointer display data is necessary to project a pointer image on the screen. As shown in FIG. 6, the pointer display data is composed of memory portions M1 to M6. Specifically, the memory portion M1 is of a flag for storage of display start/end of the pointer image, and the memory portion M2 stores which item is currently in the course of setting change. The memory portion M3 stores the shape of a mark to be displayed as a pointer image, and the memory portion M4 stores the color of a mark to be displayed as a pointer image. The memory portion M5 stores the position of a pointer image on a screen, and the memory portion M6 stores the movement speed of a pointer image on a screen. When reading the pointer display data, the main control section 78 can forward the pointer display data to the separately-provided display unit 40 as an auxiliary command. When a request comes from the separately-provided display unit 40, the main control section 78 reads the pointer display data whenever necessary, and forwards the pointer display data to the separately-provided display unit 40 as a data signal.

Via the remote control reception section 76, the main control section 78 checks whether there is an input of a movement command from the remote controller 81 as a remote control command signal, and when there is such a command input, the input details are acquired (step S14). That is, when the movement key is operated on the remote controller 81, the details of the movement key are acquired. The main control section 78 sends out such a remote control command signal as an auxiliary command signal (movement command) to the control communications line 50 via the remote control reception processing section 75 and the IF unit 77. The auxiliary command signal sent out to the control communications line 50 as such is received individually by other separately-provided display units 40 connected to the control communications line 50.

The main control section 78 then calculates coordinates on the screen at which a pointer image is to be projected (step S15). At this time, the main control section 78 refers to the memory portion M5 in the storage section 78a to read the coordinate position of the pointer image on the screen, and against the coordinate position, a displacement amount is added. The displacement amount is the one corresponding to the movement speed read from the memory portion M6 for the coordinate position. The memory portion M5 is then updated with the addition result as being a new coordinate position. Herein, the initial value of the coordinate position stored in the memory portion M5 for a pointer image is set to a specific position on the screen, i.e., the light modulation unit 62, e.g., upper right corner, or at the center.

The main control section 78 then activates the addition image processing section 73 based on the new coordinate position as a result of step S15, and derives a synthetic image (step S16). This synthetic image is a synthesis result derived in the synthetic processing section 72, synthesizing the pointer image to an external image provided to the original image processing section 71. At this time, the main control section 78 refers to the memory portions M3 and M4 in the storage section 78a to read the shape and color of a mark for display as a pointer image. The main control section 78 forwards the reading result to the addition image processing section 73, and controls the synthetic processing section 72 to output a signal corresponding thereto. That is, the synthetic processing section 72 receives an external image signal from the original image processing section 71 for storage into the frame buffer 72a, and receives an auxiliary image signal corresponding to the pointer image from the addition image processing section 73 for storage into the frame buffer 72b specifically for addition images. The synthetic processing section 72 synthesizes the signals stored in the frame buffers 72a and 72b so that the external image signal is synthesized with the auxiliary image signal.

For the synthetic signal as a result of step S16, i.e., an external image signal input to the original image processing section 71, the synthetic processing section 72 outputs a signal to the drive unit 74 (step S17). The signal here is the one equivalent to a synthetic image in which a mark image of a preset color and shape is overlaid at any specified position. The drive unit 74 applies modulation to the light modulation unit 62, corresponding to the image as a result of overlaying an auxiliary image signal on an external image signal. The auxiliary image signal here is a pointer image, and the external image signal is a moving or static image. Via the projection optical system 63, the light modulation unit 62 forms on the screen a projection image in which a pointer image is overlaid on an image corresponding to the external image signal.

The main control section 78 checks whether there is an input of a remote control command signal from the remote controller 81 via the remote control reception section 76 (step S18). Such an input of a remote control command signal means that the pointer display is through. When there is no such signal input, the procedure returns to step S14, and the main control section 78 checks whether the movement key on the remote controller 81 is operated or not. Thereafter, if a movement command is received, the similar operations are repeated as above (steps S15 to S17), and if no movement command is received, the pointer image is displayed as it is without being moved. On the other hand, when a remote control command signal is input from the remote controller 81 indicating that the pointer display is through, the main control section 78 refers to the storage section 78a to read image data corresponding to a dialog to check whether a pointer display mode is ended. The main control section 78 then controls the synthetic processing section 72 for image data synthesis via the addition image processing section 73, and controls the light modulation unit 62 to go through any corresponding display operation via the drive unit 74 (step S19). This is the end of this procedure, and the main control section 78 then deletes the pointer image from the image on the screen.

If receiving a remote control command signal indicating that the pointer display is through, the main control section 78 sends out this remote control command signal to the control communications line 50 as an auxiliary command signal. This signal sending-out is made via the remote control reception processing section 75 and the IF unit 77. The auxiliary command signal thus transmitted to the control communications line 50 is received individually by other separately provided display units 40 connected to the control communications line 50.

Described next is the main operation of the separately-provided display unit 40 of FIG. 1, mainly about the operation of the main control section 78. Note here that three separately-provided display units 40 of FIG. 1 go through the same operations as below.

Figure 7:
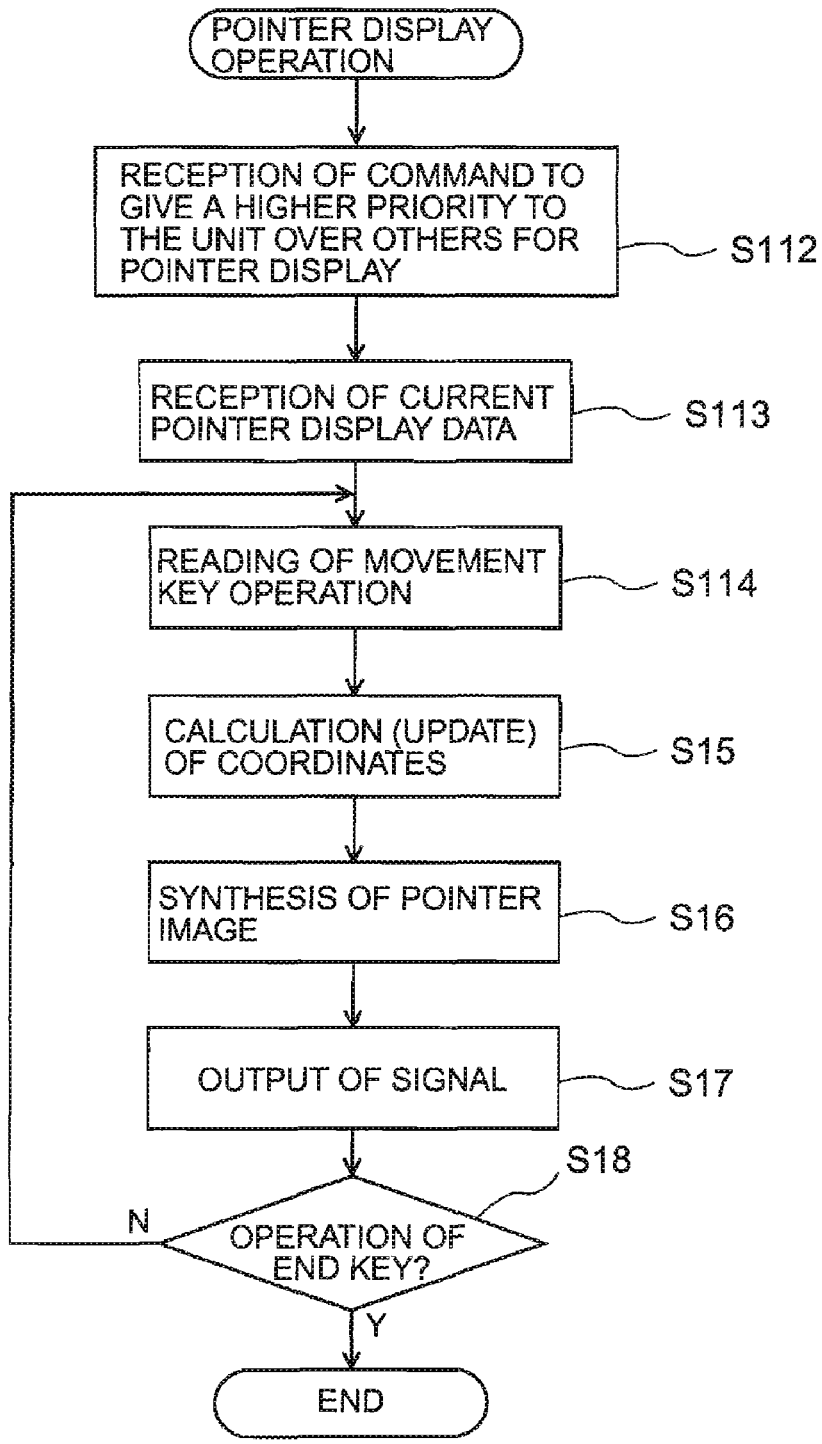
FIG. 7 is a flowchart for illustrating a pointer display operation of a separately-provided display unit.

FIG. 7 is a flowchart for illustrating a pointer display operation of the separately-provided display unit 40. Exemplified here is a case where a user wants to display a pointer image by operating the pointer image ON/OFF button 82e of the remote controller 81 belonging to the projector 20. In this case, the separately-provided display unit 40 receives a slave command signal over the control communications line 50 as an auxiliary command signal from the projector 20 (step S112). The main control section 78 of the separately-provided display unit 40 changes the operation mode so that commands coming from the remote controller 81 of the externally-provided projector 20 is activated in this separately-provided display unit 40. That is, for the commands coming from the remote controller 81, the master-slave relationship is established from a control perspective, i.e., the projector 20 being a master, and the separately-provided display unit 40 being a slave. As a result, the separately-provided display unit 40 operates in accordance with an auxiliary command signal derived from a remote control command signal from the remote controller 81 belonging to any other unit.

The main control section 78 then receives pointer display data from the projector 20 over the control communications line 50 (step S113). That is, the pointer display data is captured by the separately-provided display unit 40 through data signal exchange between the separately-provided display unit 40 and the projector 20, which is described as supplemental in step S13 of FIG. 5. This pointer display data is necessary to project a pointer image on the screen, and includes contents as shown in FIG. 6, for example. The main control section 78 of the separately-provided display unit 40 is also provided with the storage section 78a, and the pointer display data of the storage section 78a of the projector 20 is copied to the storage section 78a of the separately-provided display unit 40.

Next, the main control section 78 checks whether there is an input of a movement command from the remote controller 81 belonging to any other unit as an auxiliary command signal via the control communications line 50, the IF unit 77, and the remote control reception processing section 75. When there is such a command input, the input details are acquired (step S114). That is, in response to any remote controller operation made from the projector 20 being an operation object of the remote controller 81, an auxiliary command signal is transferred to the separately-provided display unit 40 over the control communications line 50.

The main control section 78 then calculates coordinates on the screen at which a pointer image is to be projected (step S15). At this time, the main control section 78 updates the coordinate position in the pointer display data of the storage section 78a with a new coordinate position, which is an addition result of a displacement amount corresponding to the movement speed.

The main control section 78 then activates the addition image processing section 73 based on the new coordinate position as a result of step S15, and derives a synthetic image (step S16). This synthetic image is a synthesis result derived in the synthetic processing section 72, synthesizing the pointer image to an external image provided to the original image processing section 71.

For an external image signal input to the original image processing section 71, the synthetic processing section 72 outputs a signal to the drive unit 74 (step S17). The signal here is the one equivalent to a synthetic image in which a mark image of a preset color and shape is overlaid at any specified position.

The main control section 78 checks whether there is an input of an auxiliary command signal from the remote controller 81 belonging to any other unit, i.e., the projector 20, via the control communications line 50, the IF unit 70, and the remote control reception section 75 (step S18). Such an input of an auxiliary command signal means that the pointer display is through. When there is no such signal input, the procedure returns to step S114, and the main control section 78 checks whether the movement key on the remote controller 81 belonging to any other unit is operated or not. On the other hand, when an auxiliary command signal is input from the remote controller 81 belonging to any other unit indicating that the pointer display is through, this is the end of this procedure, and the main control section 78 then deletes the pointer image from the image on the screen.

Figure 8:
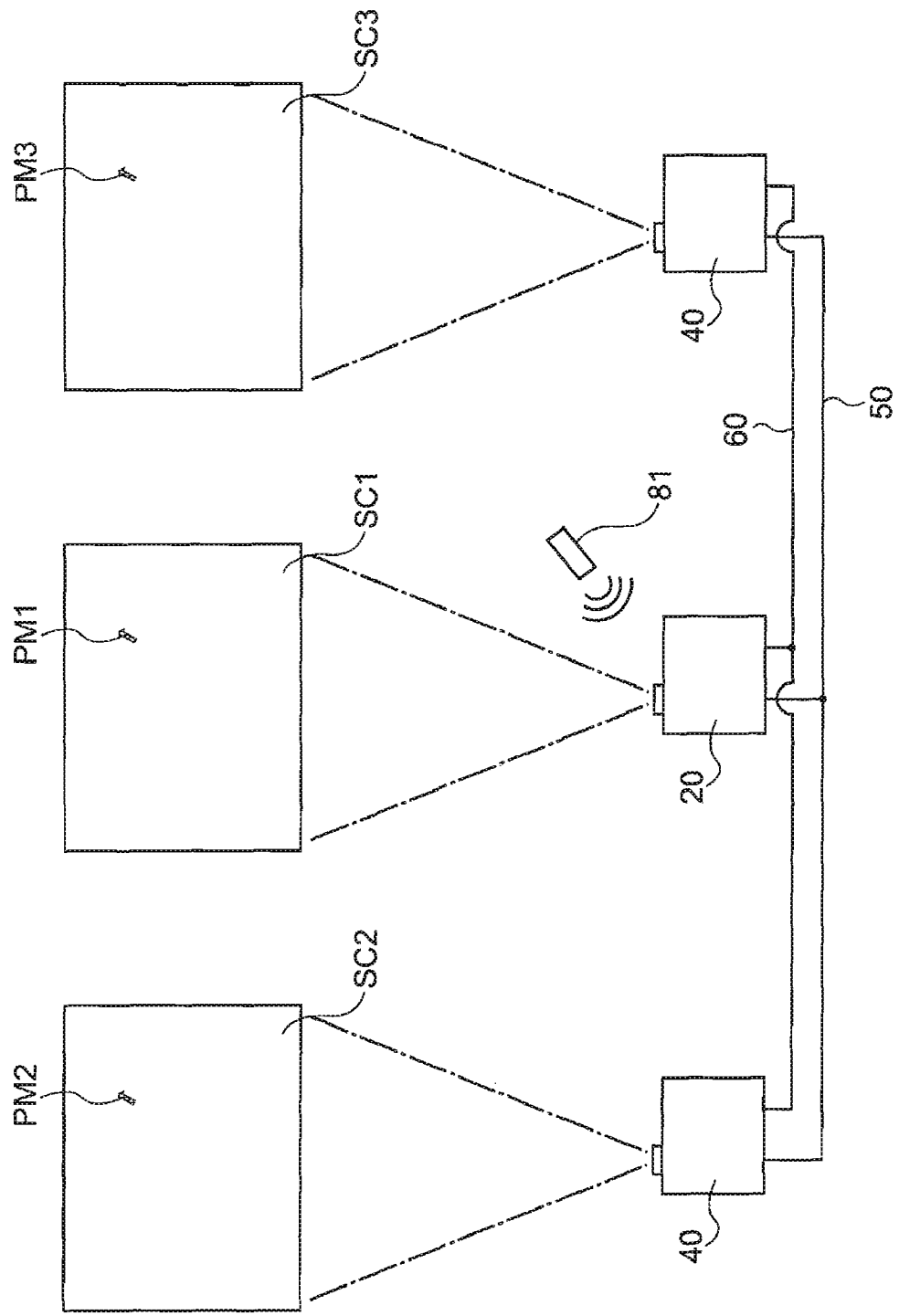
FIG. 8 is a diagram for illustrating image projection by the projection system of FIG.

FIG. 8 is a diagram for illustrating image projection by the projection system 10 of FIG. 1. The projector 20 forms a projection image on a screen SC1, and two separately-provided display units 40 form, respectively, a projection image on screens SC2 and SC3, which are disposed with a distance from the screen SC1. At such image formation, in response to any key operation made on the remote controller 81, the projector 20 displays a pointer image PM1 overlaid on an image on the screen S81 (refer to the flowchart of FIG. 5). The separately-provided display units 40 display, respectively, pointer images PM2 and PM3 overlaid on each corresponding image on the screens SC2 and SC3 in response to any key operation made on the remote controller 81 belonging to the projector 20 (refer to the flowchart of FIG. 7) As a result, the pointer images PM1, PM2, and PM3 are displayed at the corresponding positions on the screens SC1, SC2, and SC3 with the same shapes and colors.

Described next is a parameter setting operation applied to a pointer image by the projector 20. This description is given mainly about the operation of the main control section 78.

Figure 9:
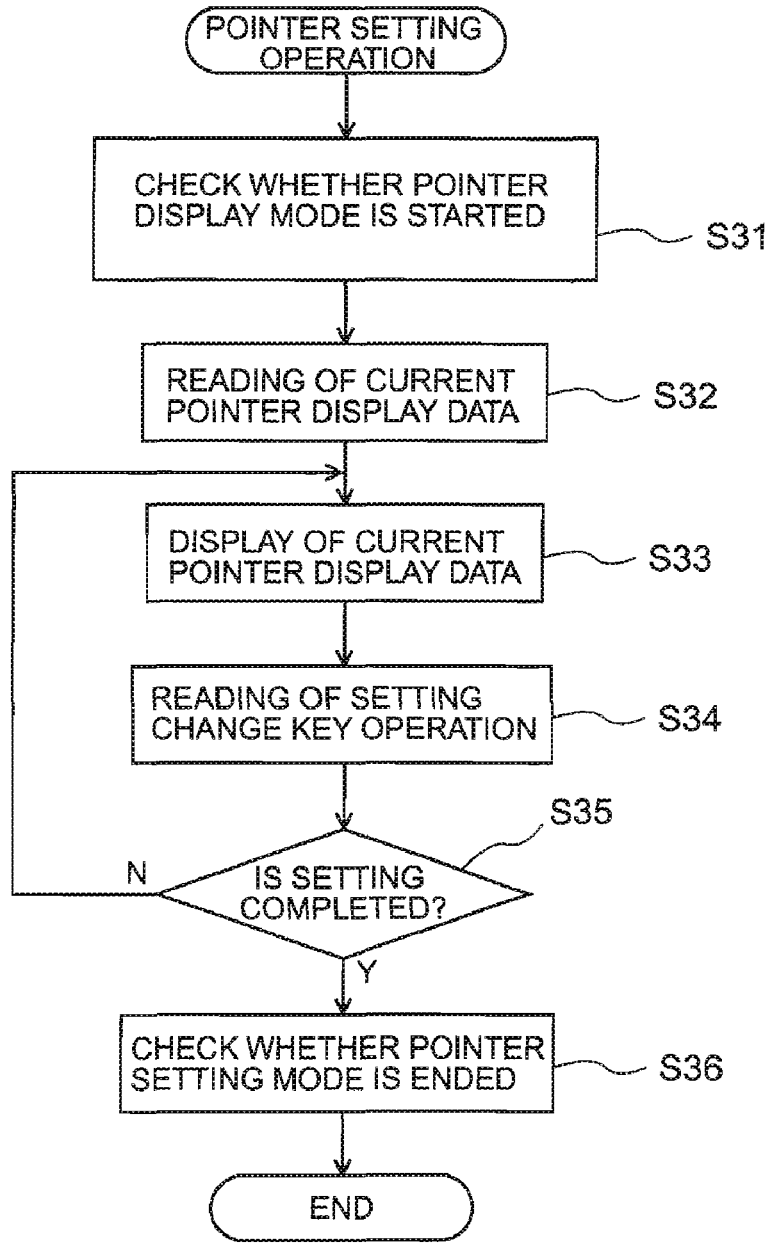
FIG. 9 is a flowchart for illustrating a parameter setting operation of a projector.

FIG. 9 is a flowchart for illustrating a parameter setting operation of the projector 20. When a user wants to make a setting change to a pointer image by operating any of the buttons of the remote controller 81, i.e., the shape change button 82g, the speed change button 82h, and the color change button 82i, the main control section 78 refers to the storage section 78a to read image data corresponding to a dialog to check whether a pointer setting mode is started. The main control section 78 then controls the synthetic processing section 72 via the addition image processing section 73 for image data synthesis, and controls the light modulation unit 62 via the drive unit 74 to go through any corresponding display operation (step S31). As a result, an image for use for checking the setting change made to the display state of the pointer image on the light modulation unit 62 is projected on the screen via the projection optical system 63.

The main control section 78 refers to the storage section 78a again this time to read the current pointer display data corresponding to the pushed button, i.e., the button 82g, 82h, or 82i (step S32). When the shape change button 82g is pushed, the data about the shape of the pointer image is read from the storage section 78a. When the pushed button is the speed change button 82h, the data read from the storage section 78a is about the speed of the pointer image. When the pushed button is the color change button 82i, the data read from the storage section 78a is about the color of the pointer image.

The main control section 73 then creates image data, controls the synthetic processing section 72 via the addition image processing section 73 for image data synthesis, and controls the light modulation unit 62 via the drive unit 74 to go through any corresponding display operation (step S33). In the image data, the pointer display data as a result of step S32 is converted into an image. As a result, the current pointer display data (speed, shape, or color) corresponding to the pushed button, i.e., the button 82g, 82h, or 82i, is displayed in text, graphics, or others.

Next, via the remote control reception section 76, the main control section 78 checks whether there is an input of a change command from the remote controller 81, and when there is such an input, acquires the details of the input (step S34). For example, if the shape change button 82g of the remote controller 81 is operated, it is regarded as an input of a change command so that the data about a shape found subsequent to the currently-set shape is acquired.

Via the remote control reception section 76, the main control section 78 checks whether there is an input of a remote control command signal from the remote controller 81, e.g., whether the pointer image ON/OFF button 82e is operated (step S35). Here, the remote control command signal means that the setting to the pointer display data is through. When there is no such input of a remote control command signal, the procedure returns to step S33, and the main control section 78 checks whether any of the change keys on the remote controller 81 is operated again, i.e., the button 82g, 82h, or 82i. On the other hand, when there is an input of a remote control command signal from the remote controller 81 indicating that the setting is through, the main control section 78 refers to the storage section 78a to read image data corresponding to a dialog to check whether a pointer setting mode is ended. The control section 78 then controls the synthetic processing section 72 via the addition image processing section 73 for image data synthesis, and controls the light modulation unit 62 via the drive unit 74 to go through a display operation (step S36). This is the end of this procedure, and the main control section 78 then deletes the pointer image from the image on the screen.

Second Embodiment

Figure 10:
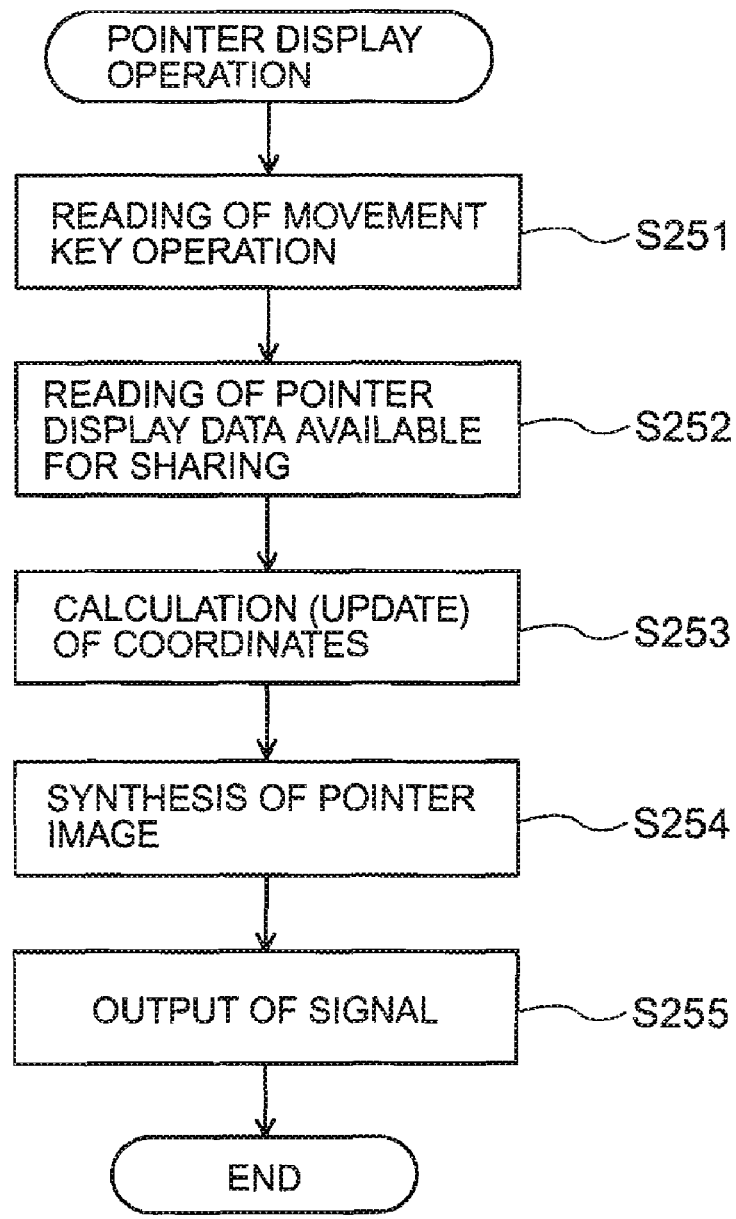
FIG. 10 is a flowchart for illustrating a pointer display operation in a second embodiment.
Figure 11:
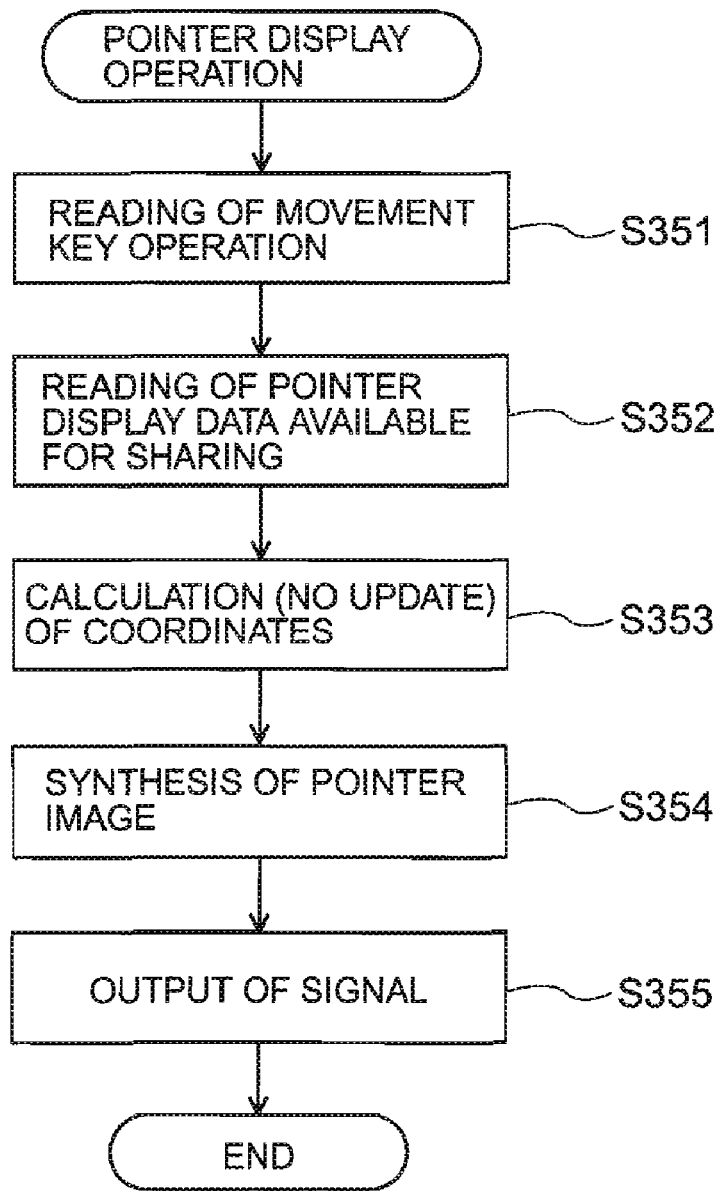
FIG. 11 is another flowchart for illustrating the pointer display operation in the second embodiment.

FIGS. 10 and 11 are both a flowchart for illustrating a projection system of a second embodiment, and correspond to FIGS. 5 and 7.

Exemplified here is the configuration in which the storage section 78a in the main control section 78 equipped to the projector 20 stores pointer display data for use by the entire system. When either the projector 20 or the separately-provided display unit 40 receives a remote control command signal from the remote controller 81 to move a pointer image, the remote control command signal is shared as an auxiliary command signal. Note here that only the projector 20 is allowed to update the pointer display data, and other separately-provided display units 40 are allowed only for slave-display of the pointer image based on the pointer display data available for sharing.

For description with more details, considered here is a case where a user wants to display a pointer image by operating the pointer image ON/OFF button 82e of the remote controller 81 or 181. Then receiving a signal of the remote controller 81 in a neighboring area, the projector 20 and any other separately-provided display units 40 share an auxiliary command signal over the control communications line 50. The auxiliary command signal is the one generated from the remote control command signal. In response thereto, the procedure of FIG. 10 is started.

As shown in FIG. 10, in the projector 20, the main control section 78 checks whether there is an input of a movement command from the remote controller 81 or 181 over the control communications line 50, and when there is such a command input, acquires the input details (step S251). Such checking is made via the remote control reception section 76, the control communications line 50, or others. The remote controller 81 is belonging to the projector 20, and the remote controller 181 is belonging to the separately-provided display unit 40.

The main control section 78 refers to the storage section 78a to read the pointer display data available for sharing (step S252).

The main control section 78 then calculates coordinates on the screen at which a pointer image is to be projected (step S253). At this time, the main control section 78 updates the coordinate position in the pointer display data of the storage section 78a with a new coordinate position, which is an addition result of a displacement amount corresponding to the movement speed.

The main control section 78 then activates the addition image processing section 73 based on the new coordinate position as a result of step S252, and derives a synthetic image (step S254). This synthetic image is a synthesis result derived in the synthetic processing section 72, synthesizing the pointer image to an external image provided to the original image processing section 71.

The synthetic processing section 72 outputs, to the drive unit 74, a signal equivalent to the resulting synthetic image, i.e., the image in which a mark image of a preset color and shape is overlaid at any specified position on an image of the external image signal input to the original image processing section 71 (step S255). In this manner, the moved pointer image is projected on the screen.

As shown in FIG. 11, on the side of the separately-provided display unit 40, the main control section 78 checks whether there is an input of a movement command from the remote controller 81 or 181 over the control communications line 50, and when there is such a command input, acquires the input details (step S351). Such checking is made via the remote control reception section 76, the control communications line 50, or others. The remote controller 81 is belonging to the projector 20, and the remote controller 181 is belonging to the separately-provided display unit 40.

The main control section 78 issues a request, over the control communications line 50 or others, to the main control section 78 of the projector 20 for transmission of pointer display data available for sharing, and receives the data on the request (step s352).

The main control section 78 then calculates coordinates on the screen at which a pointer image is to be projected (step S353). At this time, the main control section 78 updates the coordinate position in the pointer display data received in step S352 with a new coordinate position, which is an addition result of a displacement amount corresponding to the movement speed.

The main control section 78 then activates the addition image processing section 73 based on the new coordinate position as a result of step S353, and derives a synthetic image (step S354). This synthetic image is a synthesis result derived in the synthetic processing section 72, synthesizing the pointer image to an external image provided to the original image processing section 71.

The synthetic processing section 72 outputs, to the drive unit 74, a signal equivalent to the resulting synthetic image, i.e., the image in which a mark image of a preset color and shape is overlaid on an image of the external image signal input to the original at any specified position image processing section 71 (step S355). In this manner, the moved pointer image is projected on the screen.

In such a second embodiment, only the projector 20 stores pointer display data available for sharing. Alternatively, the projector 20 and the separately-provided display unit 40 separately store the pointer display data, and share only a remote control command signal. Also with this being the case, the same pointer image can be displayed on both the projector 20 and the separately-provided display unit 40.

The invention has been described by way of the embodiments, the foregoing description is in all aspects illustrative and not restrictive. For example, in the embodiments, commands coming from the remote controller 81 belonging to the projector 20 can move a pointer image not only in the projector 20 but also in the separately-provided display units 40. Alternatively, in synchronization with an operation of image switching to the next page on the projector 20, the separately-provided display units 40 is made possible for such page changing. More in detail, commands from the remote controller 81 belonging to the projector 20 enable page up-down, changing the display page of an application of a computer, e.g., the display source unit 30. With this being the case, a signal for such page up-down may be transferred to other separately-provided display units 40 to enable page up-down of an application also in the separately-provided display units 40. As an alternative to such page up-down, a command designating a display mode, e.g., contrast and color tone, may be shared between the projector 20 and the separately-provided display units 40 so as to collectively change/control the display mode for the respective units.

In the embodiments, exemplified is the case where any same pointer image is displayed on the projector 20 and the separately-provided display units 40. As an alternative to the pointer image, various same auxiliary images can be displayed on a plurality of screens, e.g., text display, boundary display, or others.

The remote controller 81 is not necessarily connected wirelessly to the projector 20, and may be connected by a cable. The remote controller 81 may be a controller unit varying in type, including an operation panel or others embedded to an exterior case of the projector 20.

In the above embodiments, exemplified is a case where the light modulation unit 62 configuring the projector body is a liquid crystal light valve of color display. As an alternative to the liquid crystal light valve, a digital mirror device or a tilt mirror device is a possible option.

What is claimed is:

1. A projector, comprising:
    an original image processing section that receives an external image signal corresponding to an original image from an image source unit;
    a remote control reception section that receives a command signal to control information of a pointer image from a remote controller;
    a remote control reception processing section that receives the command signal through the remote control reception section and based on a command from a main control section, transmits the command signal, the main control section including a storage section that stores pointer image display data and the main control section updating the pointer image display data that is stored in the storage section;
    an addition image processing section that receives the command signal through the remote control reception processing section and transmits an auxiliary signal based on the command signal; and
    an interface unit that receives the auxiliary signal through the addition image processing section and distributes the auxiliary signal for projecting the pointer image through a plurality of separately provided external projectors,
    wherein based on the auxiliary signal the pointer image together with the original image is displayed on a plurality of external projection screens respectively provided in front of the plurality of separately provided external projectors, and the plurality of separately provided external projectors are provided in different locations than a projection screen of the projector;
    the remote control reception processing section transmits the command signal to the main control section, and further transmits the command signal only if the main control section instructs the remote control reception processing section to further transmit the command signal; and
    the main control section determines whether to instruct the remote control reception processing section to further transmit the command signal based on a determination that the command signal is necessary for processing in the addition image processing section.

2. The projector according to claim 1, wherein
    the remote control reception section outputs the command signal that changes a display state of the pointer image for projection from the projector.

3. A projection system, comprising:
    the projector of claim 2;
    the plurality of separately provided external projectors that operates in accordance with the auxiliary signal output from the projector; and
    a communications unit that establishes an electrical connection between the projector and the plurality of separately provided external projectors.

4. The projector according to claim 1, wherein
    the interface unit converts the auxiliary signal output from the addition image processing section into a signal conforming to the plurality of separately provided external projectors.

5. A projection system, comprising:
    the projector of claim 4;
    the plurality of separately provided external projectors that operates in accordance with the auxiliary signal output from the projector; and
    a communications unit that establishes an electrical connection between the projector and the plurality of separately provided external projectors.

6. The projector according to claim 1, wherein
    when a contention occurs between the projector and the plurality of separately provided external projectors in terms of operation, the interface unit outputs, to the plurality of separately provided external projectors, a command signal to give a higher priority to the projector for operation.

7. A projection system, comprising:
    the projector of claim 6;
    the plurality of separately provided external projectors that operates in accordance with the auxiliary signal output from the projector; and
    a communications unit that establishes an electrical connection between the projector and the plurality of separately provided external projectors.

8. A projection system, comprising:
    the projector of claim 1;
    the plurality of separately provided external projectors that operates in accordance with the auxiliary signal output from the projector; and
    a communications unit that establishes an electrical connection between the projector and the plurality of separately provided external projectors.

* * * * *